United States Patent [19]

Playfoot et al.

[11] 3,996,801
[45] Dec. 14, 1976

[54] LIQUID METAL LEVEL SENSOR WITH INCREASED SENSITIVITY

[75] Inventors: Kerwin C. Playfoot, Horseheads; William H. Todt, Elmira Heights, both of N.Y.

[73] Assignee: Westinghouse Electric Corporation, Pittsburgh, Pa.

[22] Filed: June 16, 1975

[21] Appl. No.: 587,792

[52] U.S. Cl. .............................. 73/304 R; 336/30
[51] Int. Cl.² ........................................ G01F 23/00
[58] Field of Search .......... 73/304 R; 336/30, 220, 336/224

[56] References Cited

UNITED STATES PATENTS 3,722,281  3/1973  Marsh .............................. 73/304 R

FOREIGN PATENTS OR APPLICATIONS 1,812,181  6/1969  Germany ......................... 73/304 R Primary Examiner—Donald O. Woodiel
Attorney, Agent, or Firm—W. G. Sutcliff

[57] ABSTRACT

A liquid metal level sensor of the bifilar wound coil sensor type in which the secondary windings are of a lesser diameter than the primary windings for unbalanced operation.

4 Claims, 3 Drawing Figures

LIQUID METAL LEVEL SENSOR WITH INCREASED SENSITIVITY

BACKGROUND OF THE INVENTION

The present invention relates to inductive probes and the electronic package associated therewith for determining the level of a liquid metal in a chamber. More particularly, the probe employed is an inductively actuated bifilar wound coil which is disposed within the liquid metal bath. The primary winding of the coil is driven from a constant current source with the output signal developed in the bifilar secondary winding being a function of whether the secondary winding is effectively shorted by being immersed in the liquid metal.

Inductive bifilar wound coil probes for sensing liquid metal level are known in the art. Such inductive probes find particular application in sodium, and sodium-potassium systems which are currently under development for the breeder reactor program. These liquid metals are used as the primary coolant in such systems. A reliable and accurate means of determining the level of the liquid metal coolant in a given chamber must be provided. A large number of liquid metal level probes must be used in such systems to determine the level of the liquid metal in a variety of locations. The active length of the bifilar wound probe coil which is being used varies depending on the particular location of the probe and the degree of sensitivity and level range required for the particular sensing location. The electronic drive system is a constant current source which is transformer coupled to the probe so that a reasonable range of probe primary resistances can be driven without exceeding the range over which the current regulator will work. Thus, it is difficult to design a single electronic drive system which can be used for driving a very long coil length, as well as for driving a short coil length. The range of coil probe lengths, each of which requires a particular set of secondary taps from the drive transformer, could easily exceed the power capability of the electronic constant current drive unit coupled with the present secondary voltage measuring instrument so that desired accuracy cannot be maintained.

In prior art bifilar wound probe coils it has been the practice to operate the primary and secondary coils in a balanced configuration, that is with the coils being identical and with the wire diameter of the primary and secondary coils being the same. It is desirable to be able to vary sensitivity of a bifilar wound probe coil while permitting it to be utilized with the conventional constant current electronic drive system, which is also capable of driving a variety of other probe coils.

SUMMARY OF THE INVENTION

A bifilar wound liquid metal level probe coil is detailed in which the primary and secondary coils are unbalanced. The wire diameter of the secondary coil is preferably less than the wire diameter of the primary coil to effect unbalanced operation. The reduced diameter for the secondary winding permits a tighter coil winding and a greater sensitivity. The unbalancing of the drive coil from the sensing coil permits fabrication of a variety of coil configurations which can be driven from a common electronic package.

DESCRIPTION OF THE PREFERRED EMBODIMENT

Figure 1:
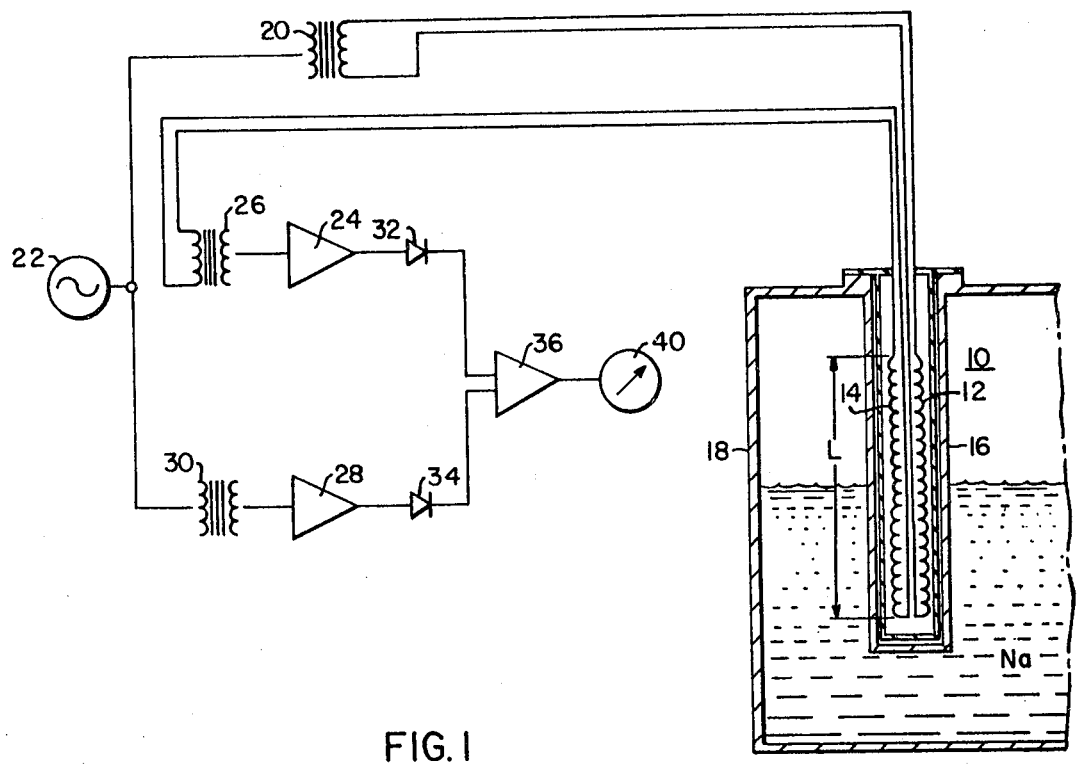
FIG. 1 is a schematic illustration of a typical liquid metal level measuring probe and drive system.

The liquid metal level probe system 10 illustrated in FIG. 1 has been used in the prior art, and the bifilar wound liquid metal level sensing probe 10 consists of a primary winding 12 and a secondary winding 14. The elongated sensing probe 10 is inserted within a probe housing 16 of a liquid metal containment vessel 18. The probe 10 monitors the level of liquid metal within the containment vessel 18. The primary windings 12 of the probe 10 are connected to the electronic drive transformer 20 which provides a constant current output, and is in turn connected to AC power source 22. The secondary windings 14 of the probe 10 are connected to amplifier 24 via transformer 26. The AC excitation signal is coupled to amplifier 28 by transformer 30, with the outputs from the amplifiers 24 and 28 being supplied through blocking rectifiers 32 and 34 respectively as inputs to the differential amplifier 36. The output signal developed by differential amplifier 36, corresponds to the difference between the AC excitation signal and the signal developed by the secondary winding 14, which is a function of the level of the liquid metal in the tank 18. The output of the differential amplifier 36 may be used to drive an indicator 40.

Figure 2:
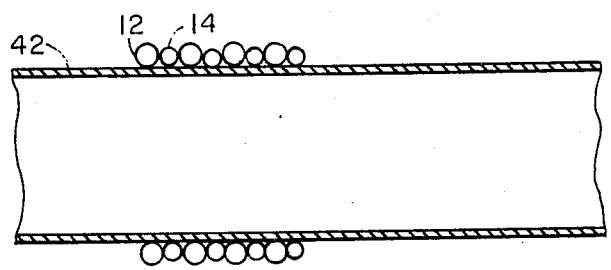
FIG. 2 is an enlarged illustration of the bifilar wound probe coil of the present invention in which the secondary windings are formed of cable with a lesser diameter than the primary windings.

A portion of the probe 10 is seen in greater detail in FIG. 2 wherein a stainless steel mandrel tube 42 is provided about which the primary winding 12 and secondary winding 14 are disposed. These windings 12 and 14 are preferably coaxial cable in which the conductive outer sheath is brazed to the mandrel 42. The center conductor of the coaxial cable functions as the transformer windings. The bifilar wound coaxial cable primary and secondary coils are tightly wrapped about the stainless steel mandrel with an outside diameter which permits insertion of the probe coil into a thimble or seal tube which extends thereinto the liquid metal containment 18. As can be seen in FIG. 2, the primary winding cable has a larger diameter than the secondary winding cable. The primary cable may be, for example, about 60 mils in diameter, while the secondary cable is about 40 mils in diameter. Such an unbalance unit would thus have a 20% greater sensitivity than a balanced system because of the greater number turns of secondary coil which can be provided for a given level range as defined by the length of the bifilar coils. The center wire diameter of the secondary coil is likewise small by about one-third of the center wire diameter of the primary coil coaxial cable. It is the center wires of the coaxial cables which actually make up the transformer windings.

Figure 3:
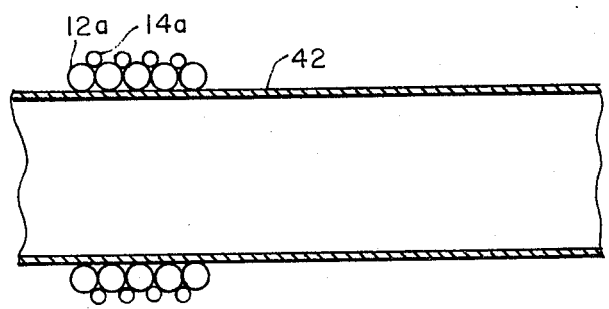
FIG. 3 is an enlarged illustration of another embodiment in which the secondary windings are smaller than the primary windings, and wherein the secondary windings are wound within the space between adjacent primary windings which cover the mandrel surface.

In the embodiment of FIG. 3, the primary winding 12a is wound with adjacent turns touching, so that the primary covers the entire mandrel surface. The secondary winding 14a is wound in the space between adjacent primary turns. This is possible because of the size difference between the larger primary diameter and the smaller secondary diameter.

The imbalance between the primary and the secondary windings permits the use of different metal conductors for the primary and secondary coils. It has been the practice to use a high linear resistance characteristic material, such as thermocouple lead wire, as the center conductor of the coaxial cables used for the bifilar balanced transformer sensor. The present invention eliminates the need to use the thermocouple wire as the secondary winding. The secondary winding does not carry significant current, so the prime desired characteristic is good ductility or drawability which will also permit reduction in the size of the secondary winding for improved accuracy. A copper center wire may be used for the secondary winding coaxial cable.

We claim:

1. A liquid level sensor for conductive liquids comprising a bifilar wound transformer probe means immersible in a liquid coupled to a power supply and sensing means which correlates transformer probe inductance changes to the liquid level, the improvement wherein the secondary coil of the transformer probe has a smaller diameter cable than the primary coil cable.

2. A liquid level sensor for conductive liquids, which is immersible in the liquid to be sensed, comprising a bifilar wound transformer probe which is immersible in the conductive liquid, the primary coil of which transformer probe is electrically connected to a constant current source power supply, with the primary and secondary coils formed of conductively sheathed coaxial cable, wherein the secondary coil cable and central conductor has a smaller diameter than does the primary cable and central conductor.

3. A liquid level sensor for conductive liquids which comprises a bifilar wound coaxial cable transformer probe which is immersible in the liquid to be sensed, the improvement wherein the primary and secondary coils of the bifilar wound transformer probe are unbalanced by having the secondary coil formed of a smaller diameter coaxial cable than the primary coil cable.

4. The sensor specified in claim 3, wherein the center wire of the secondary coil coaxial cable is a different conductive metal than the highly linear resistance characteristic center wire conductor of the primary coil coaxial cable.

* * * * *